A. O. HUBBARD.
HOOP COUPLING.
APPLICATION FILED MAR. 29, 1916.

1,286,641.

Patented Dec. 3, 1918.

WITNESSES

INVENTOR
ARTHUR O. HUBBARD
BY
ATTORNEYS

UNITED STATES PATENT OFFICE.

ARTHUR O. HUBBARD, OF MINNEAPOLIS, MINNESOTA.

HOOP-COUPLING.

1,286,641.  Specification of Letters Patent.  Patented Dec. 3, 1918.

Application filed March 29, 1916. Serial No. 87,517.

*To all whom it may concern:*

Be it known that I, ARTHUR O. HUBBARD, citizen of the United States, resident of Minneapolis, county of Hennepin, State of Minnesota, have invented certain new and useful improvements in Hoop-Couplings, of which the following is a specification.

My invention relates to means for coupling or uniting the adjacent ends of a tub, tank or silo hoop for the purpose of holding it securely against the staves under all conditions of swelling or shrinking of the wood.

A further object is to provide a coupling in which the ends of the hoop will be in line with one another when secured, thereby transmitting the pull at one end directly to the other end.

Other objects of the invention will appear from the following detailed description.

The invention consists generally in various constructions and combinations, all as hereinafter described and particularly pointed out in the claim.

Figure 3:
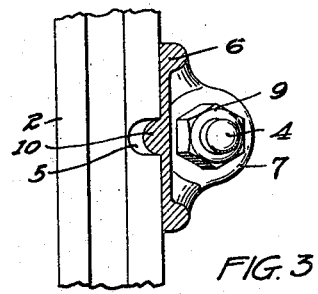
Figure 5:
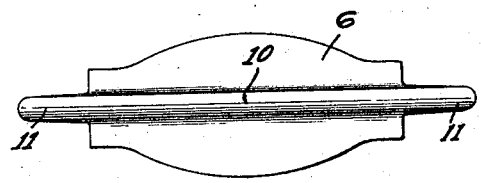
Figure 4:
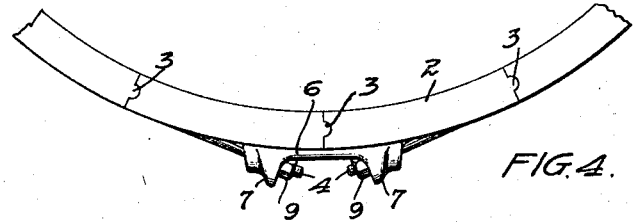
Figure 1:
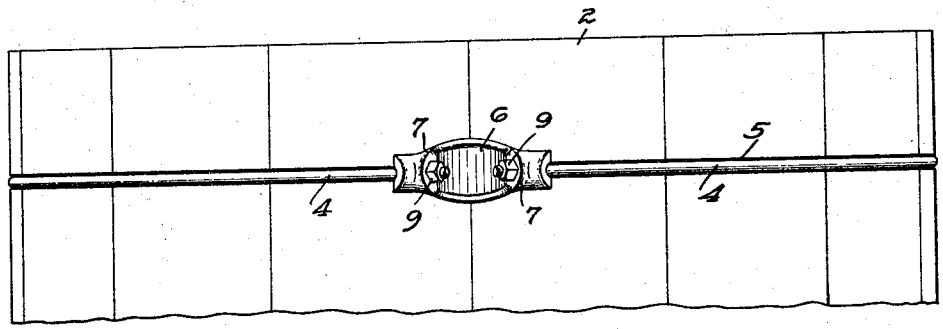
Figure 2:
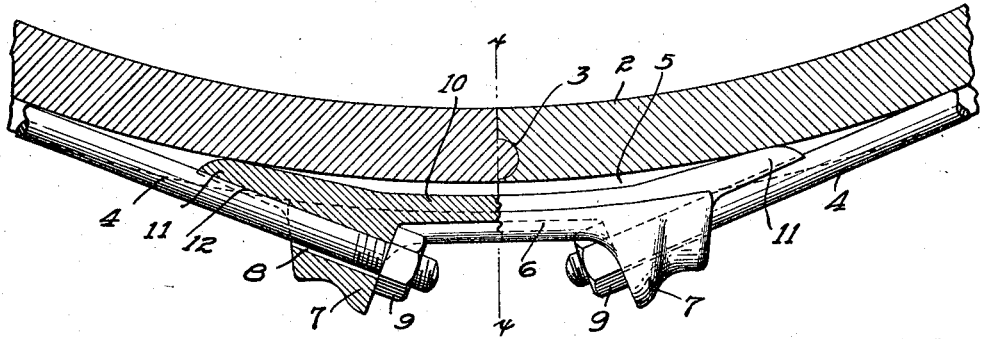

In the accompanying drawings forming part of this specification,

Figure 1 is an outside view of a portion of a tub wall and hoop with my invention applied thereto, Fig. 2 is a horizontal sectional view through the wall and coupling, Fig. 3 is a sectional view on the line x—x of Fig. 2, Fig. 4 is a top view of a portion of the wall, Fig. 5 is a bottom view of the coupling.

In the drawing, 2 represents the staves of the tub having the tongue and groove joint 3 between their vertical edges. 4 is a hoop fitting within a groove 5 in each panel which, when the tub, tank or silo wall is built, forms a continuous recess or depression in its walls wherein the hoop is seated and is held in place and which become loose through shrinkage of the wood. The coupling which I prefer to employ between the ends of the hoop consists of a casting 6 having heads 7 at each end provided with sockets 8 into which the threaded ends of the hoop are inserted and secured by nuts 9. The coupling is curved to conform to the wall of the tank or silo, as indicated in Fig. 2, and on its rear face is provided with a longitudinal rib 10 which fits into the groove 5 when the coupling is in place and at each end the coupling is provided with a tang 11 forming a continuation of the rib 10 and provided with a longitudinal depression 12 in which the end portions of the hoop are seated. When the nuts 9 are tightened, the ends of the coupling will be drawn snugly against the wall of the tub or silo and the tangs will be pressed into the groove 5 and the coupling held securely in place, the grooves in the tangs forming continuations substantially of the bearing surfaces of the ends of the hoop in the head 7. It will be noted that the ends of the hoop are in alinement with one another, so that when the nuts are tightened, the strain will be lengthwise of the coupling and there will be no tendency to twist or rack it out of position on the wall, which frequently happens when a coupling is employed with the hoop ends out of alinement with one another. This coupling may be made in various sizes, according to the manner of using it. For a tub or small tank it may be made much smaller than for use on a silo.

I claim as my invention:

The combination, with a wall and a hoop therefor, of a coupling comprising a metallic member having heads formed thereon provided with sockets to receive the ends of said hoop and opposing faces against which the tightening nuts of said hoop are seated, the rear face of said member having a longitudinal rib thereon to fit into a groove in said wall when the coupling is in place and each end of said member having a tang forming a continuation of said longitudinal rib and extending beyond said heads at each end of said member, and the outer face of each tang being provided with a longitudinal depression wherein the end portions of said hoop are seated and providing comparatively long bearing surfaces for such ends.

In witness whereof, I have hereunto set my hand this 11th day of March 1916.

ARTHUR O. HUBBARD.

Copies of this patent may be obtained for five cents each, by addressing the "Commissioner of Patents, Washington, D. C."